United States Patent
Guo et al.

(10) Patent No.: US 10,297,373 B1
(45) Date of Patent: May 21, 2019

(54) JELLY ROLL-TYPE POSITIVE TEMPERATURE COEFFICIENT DEVICE

(71) Applicant: Littelfuse, Inc., Chicago, IL (US)

(72) Inventors: Weiqing Guo, Palo Alto, CA (US); Boris Golubovic, San Francisco, CA (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 15/957,897

(22) Filed: Apr. 19, 2018

(51) Int. Cl.
| | | |
|---|---|---|
| *H01C 17/28* | (2006.01) | |
| *H01C 7/02* | (2006.01) | |
| *H01C 1/14* | (2006.01) | |
| *B32B 1/00* | (2006.01) | |
| *B32B 27/10* | (2006.01) | |
| *B32B 29/00* | (2006.01) | |
| *B32B 27/08* | (2006.01) | |
| *B32B 27/06* | (2006.01) | |

(52) U.S. Cl.
CPC ............ *H01C 7/028* (2013.01); *B32B 1/00* (2013.01); *B32B 27/06* (2013.01); *B32B 27/08* (2013.01); *B32B 27/10* (2013.01); *B32B 29/002* (2013.01); *H01C 1/1406* (2013.01); *H01C 17/28* (2013.01); *B32B 2457/00* (2013.01)

(58) Field of Classification Search
CPC ....... H01C 7/028; H01C 1/1406; H01C 17/28
See application file for complete search history.

(56) References Cited

U.S. PATENT DOCUMENTS

| 4,670,734 | A | * | 6/1987 | Caddock | .................. | H01C 7/22 |
| | | | | | | 219/121.69 |
| 4,697,335 | A | * | 10/1987 | Pedersen | ................ | H05K 3/207 |
| | | | | | | 156/155 |
| 6,794,980 | B2 | * | 9/2004 | Chu | ......................... | H01C 3/06 |
| | | | | | | 338/210 |
| 7,936,247 | B2 | * | 5/2011 | Ihle | ........................ | H01C 1/014 |
| | | | | | | 338/210 |
| 7,973,639 | B2 | * | 7/2011 | Ihle | ....................... | H01C 1/1406 |
| | | | | | | 29/610.1 |
| 8,089,337 | B2 | * | 1/2012 | Brummell | ................ | H01C 1/01 |
| | | | | | | 29/610.1 |
| 9,007,167 | B2 | * | 4/2015 | Takenaka | ............. | H01C 7/1006 |
| | | | | | | 338/333 |

* cited by examiner

*Primary Examiner* — Kyung S Lee

(57) ABSTRACT

A jelly roll-type PTC device including a PTC material layer, a first electrode layer disposed on a first surface of the PTC material layer, a second electrode layer disposed on a second surface of the PTC material layer opposite the first surface between overlapping portions of the first electrode layer and the second electrode layer, and an insulation layer disposed on a surface of the second electrode layer opposite the PTC material layer and covering a region where the first electrode layer overlaps the second electrode layer, wherein the first electrode layer, the PTC material layer, the second electrode layer, and the insulation layer are rolled together to define a jelly roll structure with the PTC material layer providing an electrically conductive pathway between the overlapping first and second electrode layers, and with the insulation layer providing an electrically insulating barrier between the first and second electrode layers.

20 Claims, 7 Drawing Sheets

JELLY ROLL-TYPE POSITIVE TEMPERATURE COEFFICIENT DEVICE

BACKGROUND

Field

The present disclosure relates generally to overcurrent and overtemperature protection devices. More specifically, the present disclosure relates to a positive temperature coefficient device having a jelly roll configuration for achieving high hold currents in compact form factors.

Description of Related Art

Positive temperature coefficient (PTC) devices are typically used in electronic devices to provide protection against overcurrent and/or overtemperature conditions. A PTC device includes a PTC material having a relatively low electrical resistance within a normal operating temperature range, and a relatively high electrical resistance above the normal operating temperature range. For example, a PTC device may be connected in series between a battery and a load so that current flowing from the battery to the load flows through the PTC material. The temperature of the PTC material gradually increases as current flowing through the PTC material increases. Ambient heat, such as may be radiated by nearby electrical components, may also cause the temperature of the PTC material to increase. When the temperature of the PTC material reaches an "activation temperature," the resistance of the PTC material increases sharply. This increase in resistance mitigates the current flowing through the PTC device, thereby protecting the battery and the load from overcurrent and overtemperature conditions.

The maximum current that a PTC device can carry before the PTC material in the PTC device reaches its activation temperature is referred to as the "hold current" of the PTC device. Hold current is inversely proportional to the resistance of the device, which is determined by the thickness and the surface area of the PTC material in the PTC device. Generally, it is much easier to vary the surface area of PTC material in a PTC device during design and manufacture than it is to vary the thickness of PTC material. Thus, the surface area of the PTC material in a PTC device is typically varied in order to achieve a desired resistance and hold current. However, in many instances the maximum surface area of PTC material in a PTC device may be limited by the form factor of a particular application (e.g., a cellular telephone).

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

A jelly roll-type PTC device in accordance with an exemplary embodiment of the present disclosure may include a PTC material layer, a first electrode layer disposed on a first surface of the PTC material layer, a second electrode layer disposed on a second surface of the PTC material layer opposite the first surface between overlapping portions of the first electrode layer and the second electrode layer, and an insulation layer disposed on a surface of the second electrode layer opposite the PTC material layer and covering a region where the first electrode layer overlaps the second electrode layer, wherein the first electrode layer, the PTC material layer, the second electrode layer, and the insulation layer are rolled together to define a jelly roll structure, with the PTC material layer providing an electrically conductive pathway between the overlapping first and second electrode layers, and with the insulation layer providing an electrically insulating barrier between the first and second electrode layers.

A method of making a jelly roll-type PTC device in accordance with an exemplary embodiment of the present disclosure may include providing a PTC material layer, disposing a first electrode layer on a first surface of the PTC material layer, disposing a second electrode layer on a second surface of the PTC material layer opposite the first surface, with the PTC material layer disposed between overlapping portions of the first electrode layer and the second electrode layer, disposing an insulation layer on a surface of the second electrode layer opposite the PTC material layer, with the insulation layer covering a region where first electrode layer overlaps the second electrode layer, and rolling the first electrode layer, the PTC material layer, the second electrode layer, and the insulation layer together to define a jelly roll structure, with the PTC material layer providing an electrically conductive pathway between the overlapping first and second electrode layers, and with the insulation layer providing an electrically insulating barrier between the first and second electrode layers.

A jelly roll-type PTC device in accordance with another exemplary embodiment of the present disclosure may include an insulation layer, a first electrode layer and a second electrode layer disposed on the insulation layer, the first and second electrode layers disposed in a coplanar, side-by-side, interdigitated relationship, and a PTC material layer disposed on the first and second electrode layers and covering interdigitated portions of the first and second electrode layers, wherein the insulation layer, first electrode layer, the second electrode layer, and the PTC material layer are rolled together to define a jelly roll structure, with the PTC material layer providing an electrically conductive pathway between the interdigitated first and second electrode layers, and with the insulation layer providing an electrically insulating barrier between the first and second electrode layers.

A method of making a jelly roll-type PTC device in accordance with another exemplary embodiment of the present disclosure may include providing an insulation layer, disposing a first electrode layer and a second electrode layer on the insulation layer in a coplanar, side-by-side, interdigitated relationship, disposing a PTC material layer on the first and second electrode layers with the PTC material layer covering interdigitated portions of the first and second electrode layers, and rolling the insulation layer, first electrode layer, the second electrode layer, and the PTC material layer together to define a jelly roll structure, with the PTC material layer providing an electrically conductive pathway between the interdigitated first and second electrode layers, and with the insulation layer providing an electrically insulating barrier between the first and second electrode layers.

DETAILED DESCRIPTION

Exemplary embodiments of a jelly roll-type positive temperature coefficient (PTC) device and a method for manufacturing the same in accordance with the present disclosure will now be described more fully hereinafter with reference to the accompanying drawings. The jelly roll-type PTC device and the accompanying method may, however, be embodied in many different forms and should not be construed as being limited to the embodiments set forth herein. Rather, these embodiments are provided so that this disclosure will convey certain exemplary aspects of the jelly roll-type PTC device and the accompanying method to those skilled in the art.

Figure 1:
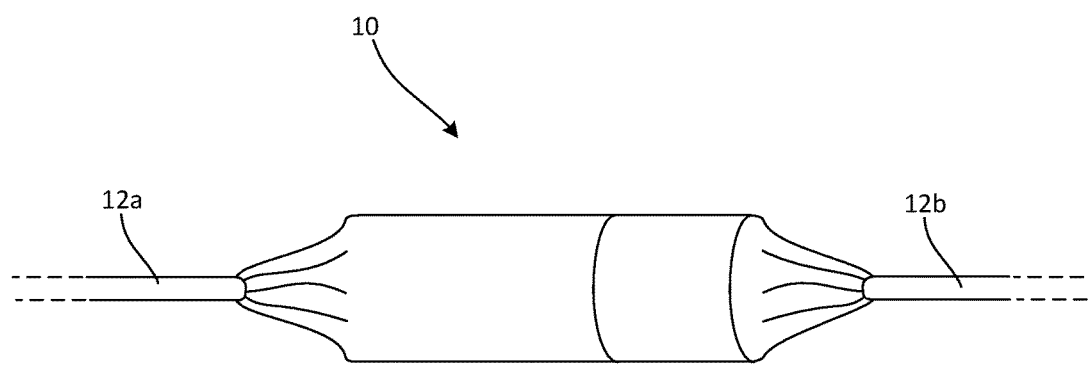
FIG. 1 is a perspective view illustrating a jelly roll-type positive temperature coefficient (PTC) device in accordance with an exemplary embodiment of the present disclosure.

Referring to FIG. 1, a perspective view illustrating a jelly roll-type PTC device 10 (hereinafter "the PTC device 10") in accordance with an exemplary embodiment of the present disclosure is shown. The PTC device 10 may be implemented for providing electronic devices with overcurrent and/or overtemperature protection. For example, the PTC device 10 may be connected electrically in series between a source of electrical power and a load (e.g., using conductive leads 12a, 12b) for mitigating electrical current flowing from the source to the load upon the occurrence of an overcurrent condition. Owing to the jelly roll configuration of the PTC device 10 (described below), the PTC device 10 may exhibit a significantly higher hold current relative to existing PTC devices of similar size. The PTC device 10 may therefore facilitate overcurrent and overtemperature protection with high hold currents in compact applications (e.g., cellular telephones).

The PTC device 10 may be formed of several layers of material that are stacked atop one another in an overlapping relationship (and optionally connected to one another) and subsequently rolled together to define a multilayer roll (a "jelly roll") as further described below. The layers of the PTC device 10, which are shown unrolled and exploded away from one another in FIG. 2A, may include a PTC material layer 14, first and second electrode layers 16, 18, and an insulation layer 20.

The PTC material layer 14 of the PTC device 10 may be formed of a flexible sheet of material that exhibits PTC characteristics that will be familiar to those of ordinary skill in the art. Particularly, the PTC material layer 14 may exhibit a relatively low electrical resistance when the temperature of the PTC material layer 14 is within a normal operating temperature range. However, when the temperature of the PTC material layer 14 is heated to a predefined "activation temperature," the electrical resistance of the PTC material layer 14 may rapidly and drastically increase (e.g., in a nonlinear fashion), thereby arresting or mitigating electrical current flowing through the PTC material layer 14. In various, non-limiting embodiments, the PTC material layer 14 may have an activation temperature in a range of about 176 degrees Fahrenheit to about 230 degrees Fahrenheit and may have a thickness in a range of about 10 μm to about 100 μm.

In a specific, non-limiting embodiment, the PTC material layer 14 may be formed of a polymeric positive temperature coefficient (PPTC) material that includes electrically conductive particles suspended in a polymer resin. The polymer resin may be, or may include, a semi-crystalline polymer, such as polyvinylidene difluoride, polyethylene, ethylene tetrafluoroethylene, ethylene-vinyl acetate, or ethylene butyl acrylate. Other materials having similar characteristics may also be used. The conductive particles in the PPTC material may be formed of various electrically conductive metallic or ceramic materials, including, but not limited to, tungsten carbide, nickel, titanium carbide, and the like.

The first and second electrode layers 16, 18 of the PTC device 10 may be substantially identical and may be formed of flexible and/or malleable sheets of electrically conductive metal foil or metallized polyamide material. In various, non-limiting examples, the first and second electrode layers 16, 18 may be formed of copper foil or tin foil. The present disclosure is not limited in this regard, and it is contemplated that the first and second electrode layers 16, 18 may be formed of any sufficiently flexible and/or malleable, electrically conductive material that may be formed into a sheet, foil, ribbon, etc. and rolled in the manner described herein.

Figure 2A:
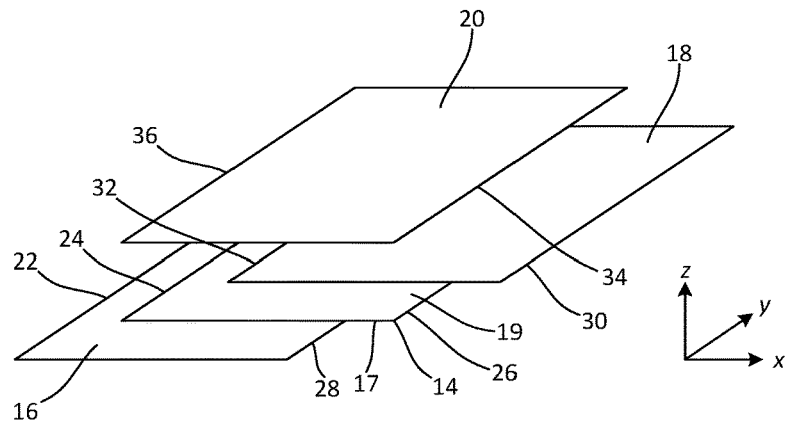
FIG. 2A is an exploded view illustrating the various layers of the jelly roll-type PTC device shown in FIG. 1.

The first and second electrode layers 16, 18 may be disposed on opposite sides of the PTC material layer 14 in flat, overlapping engagement therewith. For example, as shown in FIG. 2A, the first electrode layer 16 may be disposed below, and in flat contact with, a first, bottom surface 17 of the PTC material layer 14, and the second electrode layer 18 may be disposed above, and in flat contact with, a second, top surface 19 of the PTC material layer 14. The first electrode layer 16 may be laterally offset (i.e., offset along the x axis) relative to the PTC material layer 14 in a first direction, and the second electrode layer 16 may be laterally offset relative to the PTC material layer 14 in a second direction opposite the first direction. For example, as shown in FIG. 2A and in the top and bottom views of the layers shown in FIGS. 2B and 2C, the first electrode layer 16 may be offset leftward along the x axis relative to the PTC material layer 14, such that a leftmost edge 22 of the first electrode layer 16 extends beyond a leftmost edge 24 of the PTC material layer 14, and such that a rightmost edge 26 of the PTC material layer 14 extends beyond a rightmost edge 28 of the first electrode layer 16. The second electrode layer 18 may be offset rightward along the x axis relative to the PTC material layer 14, such that a rightmost edge 30 of the second electrode layer 18 extends beyond the rightmost edge 26 of the PTC material layer 14, and such that the leftmost edge 24 of the PTC material layer 14 extends beyond a leftmost edge 32 of the second electrode layer 18.

Figure 2B:
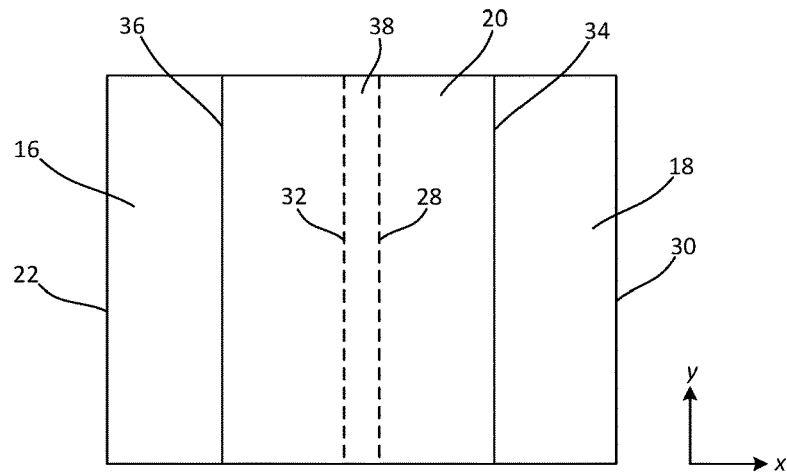
FIG. 2B is a top view illustrating the layers shown in FIG. 2A.
Figure 2C:
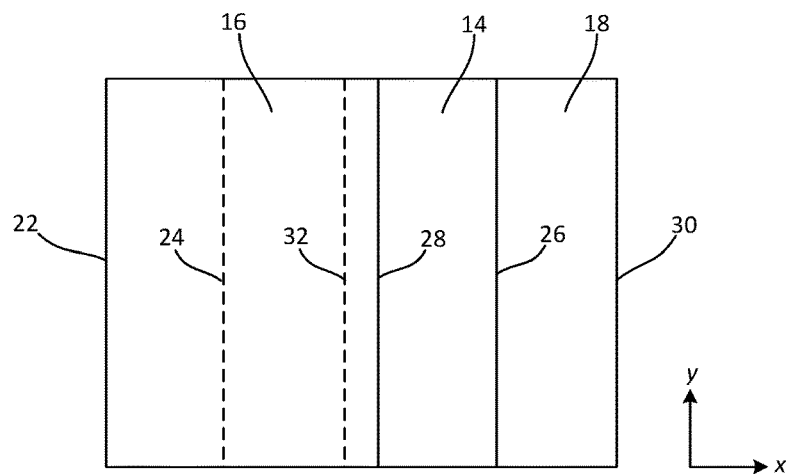
FIG. 2C is a bottom view illustrating the layers shown in FIG. 2A.

Notwithstanding the above-described laterally offset relationship of the first and second electrode layers 16, 18 relative to the PTC material layer 14, the first and second electrode layers 16, 18 may also laterally overlap one another along the x axis. That is, the rightmost edge 28 of the first electrode layer 16 may extend rightward beyond the leftmost edge 32 of second electrode layer 18 as best shown in FIGS. 2B and 2C. Thus, each of the PTC material layer 14 and the first and second electrode layers 16, 18 may laterally overlap each other of the PTC material layer 14 and the first and second electrode layers 16, 18, with the first and second electrode layers 16, 18 together overlapping the entirety of the PTC material layer 14 along the x axis.

In various embodiments, the first and second electrode layers 16, 18 may be affixed or connected to the opposing first and second surfaces 17, 19 of the PTC material layer 14. For example, the first and second electrode layers 16, 18 may be affixed or connected to the PTC material layer 14 with solder, various conductive adhesives, welds, etc. In other embodiments, the PTC material layer 14 and the first and second electrode layers 16, 18 may be loosely stacked together and not connected or affixed to one another.

The insulation layer 20 of the PTC device 10 may be formed of a sheet of flexible and/or malleable, electrically insulating material. Examples of such materials include, but are not limited to, polyvinyl chloride (PVC), Mylar, paper, and the like. The present disclosure is not limited in this regard, and it is contemplated that the insulation layer 20 may be formed of any sufficiently flexible and/or malleable, electrically insulating material that may be formed into a sheet, foil, ribbon, etc. and rolled in the manner described herein.

The insulation layer 20 may be disposed atop the PTC material layer 14 and the first and second electrode layers 16, 18, and may cover a region 38 where the first and second electrode layers 16, 18 overlap one another. For example, a rightmost edge 34 of the insulation layer 20 may extend rightward to or beyond the rightmost edge 28 of the first electrode layer 16, and a leftmost edge 36 of the insulation layer 20 may extend leftward to or beyond the leftmost edge 32 of the second electrode layer 18. Additionally, the longitudinal edges of the insulation layer 20 may extend at least to the longitudinal edges of the first and second electrode layers 16, 18 along they axis. In various embodiments, the insulation layer 20 may be affixed or adhered to the underlying layers.

In the embodiment of the PTC device 10 illustrated in the provided figures, the dimensions and position of the insulation layer 20 along the x and y axes may be substantially similar to those of the PTC material layer 14. That is, the insulation layer 20 may have the same size and shape and the same lateral and longitudinal positions as the PTC material layer 14. The present disclosure is not limited in this regard, and in various alternative embodiments the insulation layer 20 may have a size, shape, and/or position that are different than those of the PCT material layer 14. In some embodiments, the insulation layer 20 may have a length along the y axis that extends well beyond (e.g., several centimeters or several inches beyond) the upper and/or lower longitudinal edges of the underlying layers. When the layers of such an embodiment of the PTC device 10 are rolled together as further described below, the extra length of the insulation layer 20 (i.e., the length of the insulation layer 20 that extends beyond the lengths of the underlying layers) may wrap entirely around the outer surfaces of the underlying layers and may be provide the PTC device 10 with an electrically insulating, protective wrapper.

Figure 3A:
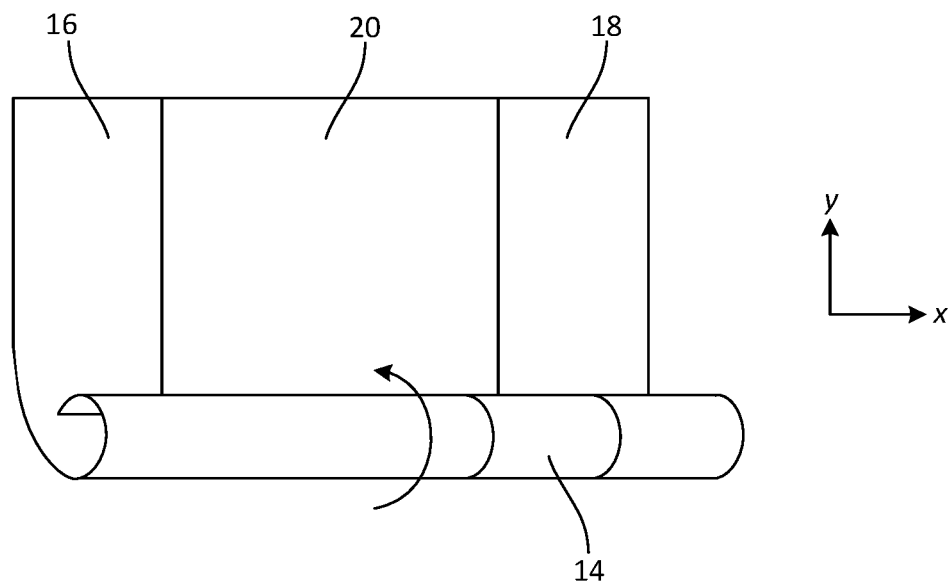
FIG. 3A is a perspective view illustrating the various layers of the jelly roll-type PTC device shown in FIG. 1 being rolled together.
Figure 3B:
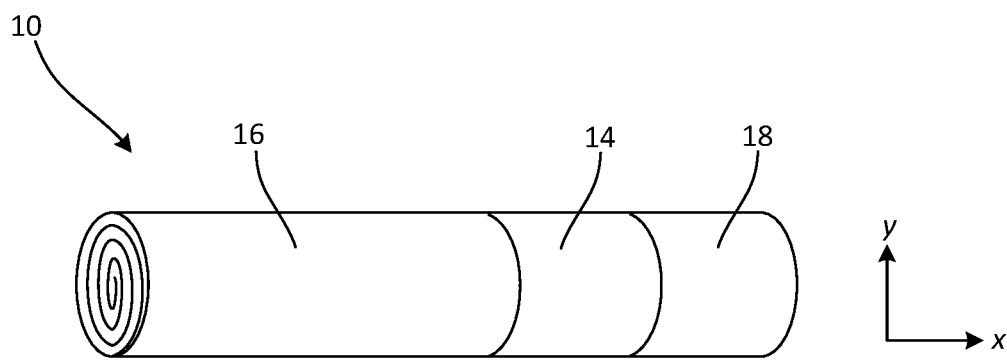
FIG. 3B is a perspective view illustrating the various layers shown in FIG. 3A when fully rolled together.

Referring to FIG. 3A, the stacked layers of the PTC device 10, including the PTC material layer 14, the first and second electrode layers 16, 18, and the insulation layer 20, are shown being rolled together to form the jelly roll structure shown in FIG. 3B. Particularly, with the layers oriented in the manner shown in FIG. 3A, the layer stack is rolled from its lower longitudinal edge upwardly and onto itself. When the layer stack is rolled together thusly, the insulation layer 20 provides a continuous, electrically insulating barrier between the first and second electrode layers 16, 18 in the fully rolled jelly roll structure shown in FIG. 3B. Thus, when current is applied to the PTC device 10 (as further described below), the current flows from the first electrode layer 16, through the PTC material layer 14, to the second electrode layer 18 (or vice versa), and is prevented from shorting directly between the first and second electrode layers 16, 18.

Referring back to FIG. 1, conductive leads 12a, 12b may be inserted into opposing ends of the PTC device 10, with the conductive lead 12a extending into the rolled first electrode layer 16 at the left side of the PTC device 10, and with the conductive lead 12b extending into the rolled second electrode layer 18 at the right side of the PTC device 10. The rolled first electrode layer 16 and the rolled second electrode layer 18 may be crimped onto the conductive leads 12a, 12b, respectively, as shown in FIG. 1, to secure the conductive leads 12a, 12b in electrical contact therewith. In various embodiments, the conductive leads 12a, 12b may additionally or alternatively be electrically connected to the first and second electrode layers 16, 18 with solder, electrically conductive adhesive, or the like.

The conductive leads 12a, 12b may connect the PTC device 10 in an electrical circuit, such as between a source of electrical power and an electrical load. Since electrical current passing through the PTC device 10 must flow through the PTC material layer 14, and since the rolled PTC material layer 14 may have a surface area that is significantly larger than that of PTC materials employed in existing PTC devices having similar form factors, the PTC device 10 may exhibit a significantly higher hold current relative to existing PTC devices of similar size. The PTC device 10 may therefore facilitate overcurrent and overtemperature protection with high hold currents in compact applications (e.g., cellular telephones, wearable electronic devices, etc.).

Figure 4:
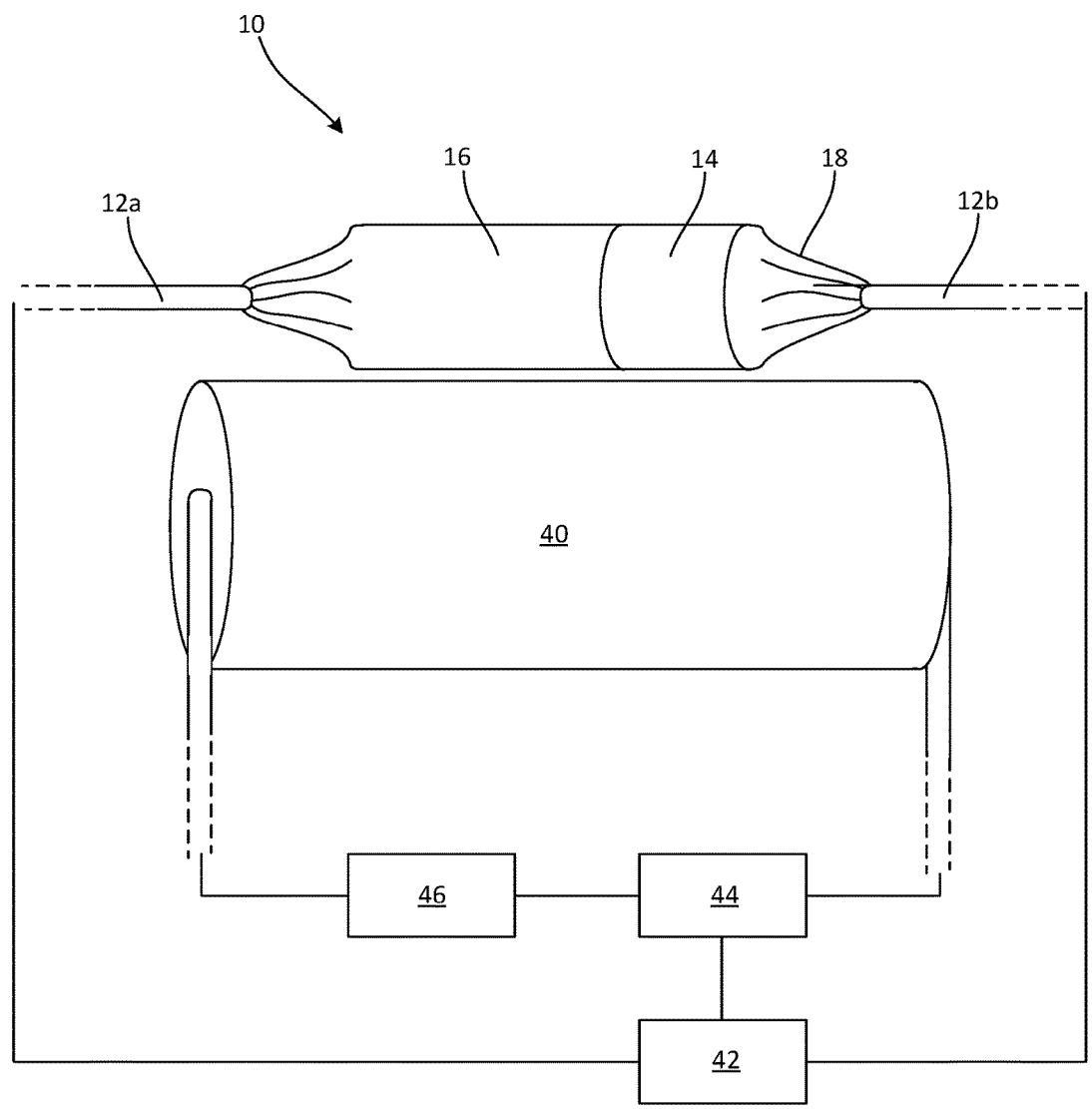
FIG. 4 is a schematic view illustrating an implementation of the jelly roll-type PTC device shown in FIG. 1 as a temperature sensor.

Referring to FIG. 4, a schematic view illustrating an alternative implementation of the PTC device 10 is shown wherein the PTC device 10 is used as a temperature sensor for monitoring the temperature of an adjacent electrical component 40 (e.g., a battery cell). The PTC device 10 may be connected to a control element 42 (e.g., a digital control element such as an ASIC, a microprocessor, etc.) which may in-turn be connected to a switch 44 that connects or disconnects the electrical component 40 to/from a load 46. During normal operation of the electrical component 40, the temperature of the electrical component 40 may be within a normal operating range (e.g., less than 80 degrees Celsius), and the electrical component 40 may supply electrical current to the load 46 via the closed switch 44. However, upon the occurrence of an overtemperature/overcurrent condition, the temperature of the electrical component 40 may increase above the normal operating range, and heat radiated by the electrical component may cause the temperature of the adjacent PTC device 10 to increase. If the temperature of the PTC device 10 increases above the activation temperature of the PTC material layer 14, the resistance of the PTC material layer 14 may increase sharply.

The control element 42 may be configured to monitor a resistance in the PTC device 10 and to control operation of the switch 44 accordingly. For example, if the control element 42 measures a relatively low resistance in the PTC device 10, the control element may determine that the temperature of the adjacent electrical component 40 is within a normal, safe operating range. However, if the control element 42 measures a relatively high resistance in the PTC device 10, the control element 42 may determine that the temperature of the electrical component 42 has exceeded the normal, safe operating range, and may open the switch 44 to arrest the flow of current to the load 46 and prevent or mitigate damage that could otherwise result from the overtemperature or overcurrent condition.

Figure 5:
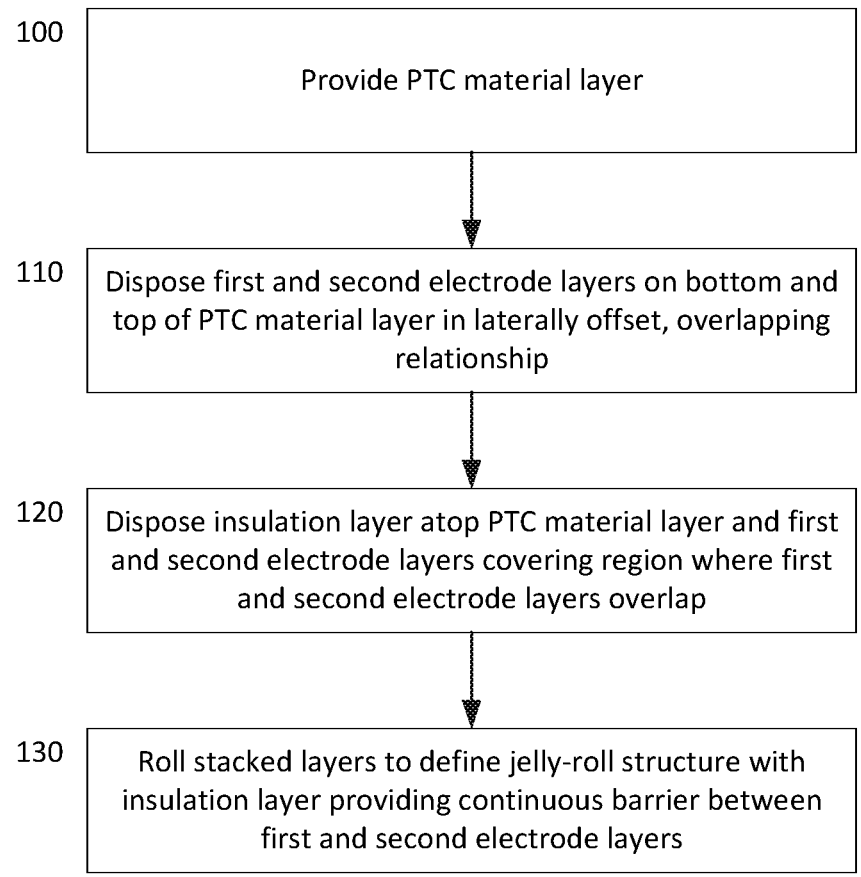
FIG. 5. Is a flow diagram illustrating an exemplary method for manufacturing the PTC device shown in FIGS. 1-3B.

Referring to FIG. 5, a flow diagram illustrating an exemplary method for manufacturing the above-described PTC device 10 in accordance with the present disclosure is shown. The method will now be described in conjunction with the illustrations of the PTC device 10 shown in FIGS. 1-3B.

At block 100 of the exemplary method, the substantially planar, flexible/malleable PTC material layer 14 may be provided. In various embodiments, the PTC material layer 14 may be formed of a polymeric positive temperature coefficient (PPTC) material. At block 110 of the method, the substantially planar, flexible/malleable, electrically conductive first and second electrode layers 16, 18 may be disposed in a stacked, laterally-offset, overlapping arrangement on the bottom and top of the PTC material layer 14 as described above, with the first electrode layer 16 flatly abutting the bottom surface of the PTC material layer 14 and with the second electrode layer 18 flatly abutting the top surface of the PTC material layer 14. In various embodiments, one or both of the first and second electrode layers 16, 18 may be connected or affixed to the PTC material layer 14, such as with solder, welds, conductive adhesive, etc.

At block 120 of the exemplary method, the substantially planar, flexible/malleable, electrically insulating insulation layer 20 may be disposed atop the PTC material layer 14 and the first and second electrode layers 16, 18, with the insulation layer 20 covering the region 38 where the first and second electrode layers 16, 18 overlap one another. In various embodiments, the insulation layer 20 may be affixed or adhered to the underlying layers.

At block 130 of the exemplary method, the stacked layers of the PTC device 10, including the PTC material layer 14, the first and second electrode layers 16, 18, and the insulation layer 20, may be rolled together to form the jelly roll structure shown in FIG. 3B. Particularly, with the layers oriented in the manner shown in FIG. 3A, the layer stack may be rolled from its lower longitudinal edge upwardly and onto itself. When the layer stack is rolled together thusly, the insulation layer 20 provides a continuous, electrically insulating barrier between the rolled first and second electrode layers 16, 18 in the fully rolled jelly roll structure shown in FIG. 3B. Thus, when current is applied to the PTC device 10, the current flows from the first electrode layer 16, through the PTC material layer 14, to the second electrode layer 18 (or vice versa), and is prevented from shorting directly between the first and second electrode layers 16, 18.

Figure 6A:
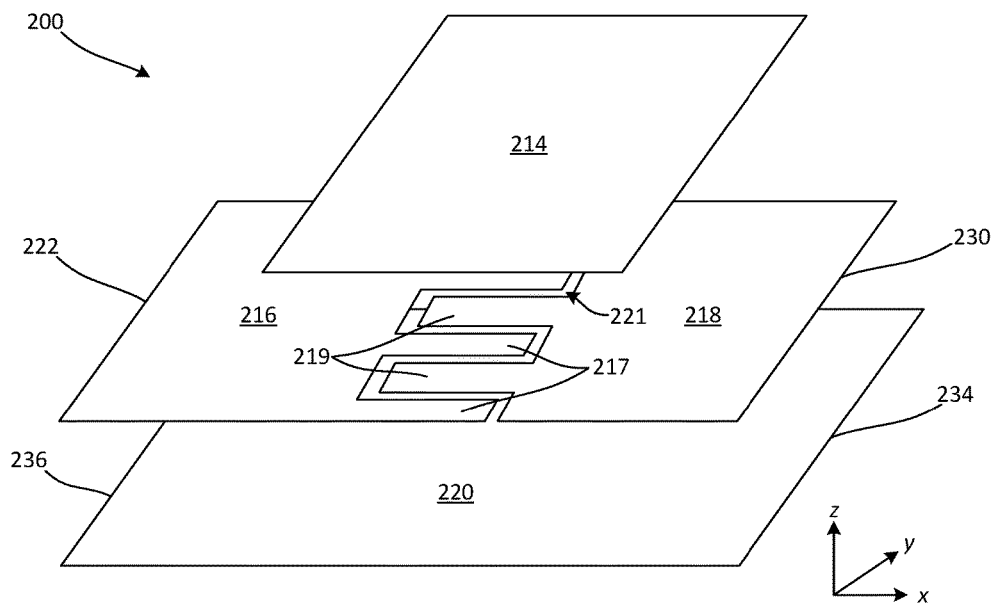
FIG. 6A is an exploded view illustrating various layers of a jelly roll-type PTC device in accordance with another exemplary embodiment of the present disclosure.
Figure 6B:
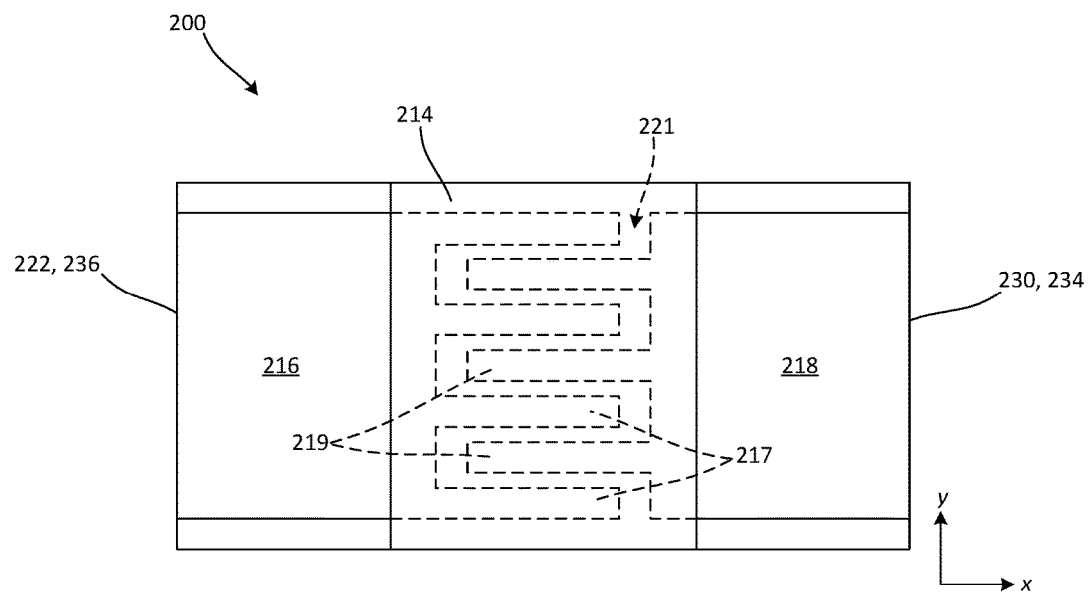
FIG. 6B is a top view illustrating the layers shown in FIG. 6A.

Referring to FIGS. 6A and 6B, a perspective view and a top view illustrating a jelly roll-type PTC device 200 (hereinafter "the PTC device 200") in accordance with another exemplary embodiment of the present disclosure is shown. The PTC device 200 may be formed of several layers of material, which are shown unrolled and exploded away from one another in FIG. 6A for clarity, that are stacked atop one another in an overlapping relationship (and optionally connected to one another) and subsequently rolled together to define a multilayer roll (a "jelly roll") as further described below. The layers of the PTC device 200 may include a PTC material layer 214, first and second electrode layers 216, 218, and an insulation layer 220.

The insulation layer 220 of the PTC device 200 may be formed of a sheet of flexible and/or malleable, electrically insulating material. Examples of such materials include, but are not limited to, polyvinyl chloride (PVC), Mylar, paper, and the like. The present disclosure is not limited in this regard, and it is contemplated that the insulation layer 220 may be formed of any sufficiently flexible and/or malleable, electrically insulating material that may be formed into a sheet, foil, ribbon, etc. and rolled in the manner described herein.

The first and second electrode layers 216, 218 of the PTC device 200 may be formed of flexible and/or malleable sheets of electrically conductive metal foil or metallized polyamide material. In various, non-limiting examples, the first and second electrode layers 216, 218 may be formed of copper foil or tin foil. The present disclosure is not limited in this regard, and it is contemplated that the first and second electrode layers 216, 218 may be formed of any sufficiently flexible and/or malleable, electrically conductive material that may be formed into a sheet, foil, ribbon, etc. and rolled in the manner described herein.

The first and second electrode layers 216, 218 may be disposed in a coplanar, side-by-side arrangement on a top surface of the insulation layer 220 in flat engagement therewith. The first electrode layer 216 may be disposed primarily on the left side of the insulation layer 220 and the second electrode layer 218 may be disposed primarily on a right side of the insulation layer 220, for example. The first and second electrode layers 216, 218 may include respective pluralities of castellations 217, 219 arranged in an interdigitated or interleaved relationship to define a circuitous gap 221 therebetween. The number and shape of the castellations 217, 219 is not critical and may be varied relative to those shown in the figures without departing from the scope of the present disclosure.

As shown in FIG. 6B, the combined width of the first and second electrode layers 216, 218 may be substantially equal to the width of the insulation layer 220. The leftmost edge 222 of the first electrode layer 216 may be laterally aligned with the leftmost edge 236 of the insulation layer 220, and the rightmost edge 230 of the second electrode layer 218 may be laterally aligned with the rightmost edge 234 of the insulation layer 220. The lengths of first and second electrodes 216, 218 along they axis may be shorter than that of the insulation layer 220 such that the longitudinal edges of the insulation layer 220 extend beyond the longitudinal edges of the first and second electrode layers 216, 218. The above-described dimensions and positions are not intended to be limiting and may be varied without departing from the scope of the present disclosure.

In various embodiments, the first and second electrode layers 216, 218 may be printed or deposited (e.g., via electrolytic deposition) on the top surface of the insulation layer 220. In other embodiments, the first and second electrode layers 216, 218 may be affixed or connected to the top surface of the insulation layer 220. For example, the first and second electrode layers 216, 218 may be affixed or connected to the insulation layer 220 with various adhesives, welds, etc. In other embodiments, the insulation layer 220 and the first and second electrode layers 216, 218 may be loosely stacked together and not connected or affixed to one another.

The PTC material layer 214 of the PTC device 200 may be disposed atop the first and second electrode layers 216, 218 and may cover the interdigitated castellations 217, 219. The PTC material layer 214 may thus provide an electrically conductive connection between the first and second electrode layers 216, 218 (i.e., when the temperature of the PTC material layer 214 is within a normal operating temperature range as described below). In various embodiments, the PTC material layer 214 may be affixed or connected to the first and second electrode layers 216, 218, such as with solder, welds, conductive adhesive, etc.

As shown in the figures, the PTC material layer 214 may have a length along the y axis that is substantially equal to the lengths of the first and second electrode layers 216, 218, and the longitudinal edges of the PTC material layer 214 may be substantially aligned with the longitudinal edges of the first and second electrode layers 216, 218. The PTC material layer 214 may be narrower along the x axis than the combined width of the first and second electrode layers 216, 218. The above-described dimensions and positions are not intended to be limiting and may be varied without departing from the scope of the present disclosure.

The PTC material layer 214 may be formed of a flexible sheet of material that exhibits PTC characteristics that will be familiar to those of ordinary skill in the art. Particularly, the PTC material layer 214 may exhibit a relatively low electrical resistance when the temperature of the PTC material layer 214 is within a normal operating temperature range. However, when the temperature of the PTC material layer 214 is heated to a predefined "activation temperature," the electrical resistance of the PTC material layer 214 may rapidly and drastically increase (e.g., in a nonlinear fashion), thereby arresting or mitigating electrical current flowing through the PTC material layer 214. In various, non-limiting embodiments, the PTC material layer 214 may have an activation temperature in a range of about 276 degrees Fahrenheit to about 230 degrees Fahrenheit and may have a thickness in a range of about 20 µm to about 200 µm.

In a specific, non-limiting embodiment, the PTC material layer 214 may be formed of a polymeric positive temperature coefficient (PPTC) material that includes electrically conductive particles suspended in a polymer resin. The polymer resin may be, or may include, a semi-crystalline polymer, such as polyvinylidene difluoride, polyethylene, ethylene tetrafluoroethylene, ethylene-vinyl acetate, or ethylene butyl acrylate. Other materials having similar characteristics may also be used. The conductive particles in the PPTC material may be formed of various electrically conductive metallic or ceramic materials, including, but not limited to, tungsten carbide, nickel, titanium carbide, and the like.

The stacked layers of the PTC device 200, including the PTC material layer 214, the first and second electrode layers 216, 218, and the insulation layer 220, may be rolled together to form a jelly roll structure similar to that shown in FIG. 3B. Particularly, with the layers oriented in the manner shown in FIG. 6B, the layer stack may be rolled from its lower longitudinal edge upwardly and onto itself in a manner similar to that described above with regard to the PTC device 10. When the layer stack is rolled together thusly, the insulation layer 220 provides a continuous, electrically insulating barrier between the rolled first and second electrode layers 216, 218 in the fully rolled jelly roll structure of the PTC device 200. Thus, when current is applied to the PTC device 200, the current flows from the first electrode layer 216, through the PTC material layer 214, to the second electrode layer 218 (or vice versa), and is prevented from shorting directly between the first and second electrode layers 216, 218.

As with the PTC device 10 described above, conductive leads (not shown) may be inserted into opposing ends of the PTC device 200, with a first conductive lead extending into the rolled first electrode layer 216 at the left side of the PTC device 200, and with a second conductive lead extending into the rolled second electrode layer 218 at the right side of the PTC device 200. The rolled first electrode layer 216 and the rolled second electrode layer 218 may be crimped onto the respective conductive leads and may thus be secured in electrical contact therewith. In various embodiments, the conductive leads may additionally or alternatively be electrically connected to the first and second electrode layers 216, 218 with solder, electrically conductive adhesive, or the like.

The conductive leads may connect the PTC device 200 in an electrical circuit, such as between a source of electrical power and an electrical load. Since electrical current passing through the PTC device 200 must flow through the PTC material layer 214, and since the rolled PTC material layer 214 may have a surface area that is significantly larger than that of PTC materials employed in existing PTC devices having similar form factors, the PTC device 200 may exhibit a significantly higher hold current relative to existing PTC devices of similar size. The PTC device 200 may therefore facilitate overcurrent and overtemperature protection with high hold currents in compact applications (e.g., cellular telephones, wearable electronic devices, etc.) as described above with regard to the PTC device 10. For example, the PTC device 200 may be substituted for the PTC device 10 in the application shown in FIG. 4.

Figure 7:
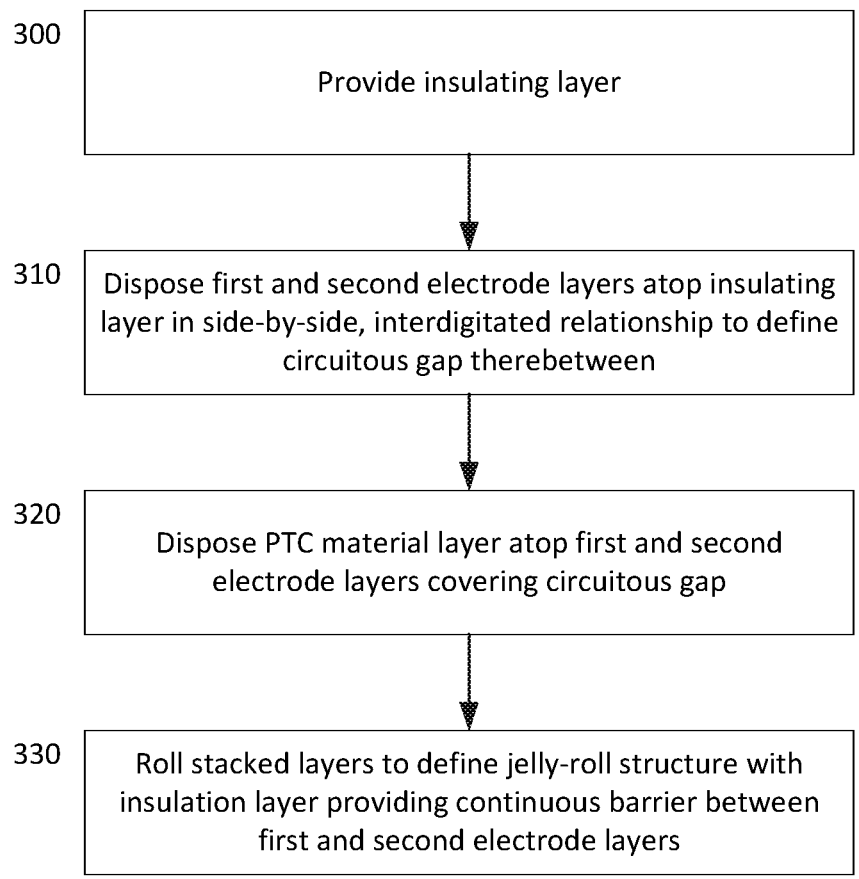
FIG. 7. Is a flow diagram illustrating an exemplary method for manufacturing the PTC device shown in FIGS. 6A and 6B.

Referring to FIG. 7, a flow diagram illustrating an exemplary method for manufacturing the above-described PTC device 200 in accordance with the present disclosure is shown. The method will now be described in conjunction with the illustrations of the PTC device 200 shown in FIGS. 6A and 6B.

At block 300 of the exemplary method, the substantially planar, flexible/malleable, electrically insulating insulation layer 220 may be provided. In various embodiments, the insulation layer 220 may be formed of a sheet of paper, plastic, Mylar, etc.

At block 310 of the method, the substantially planar, flexible/malleable, electrically conductive first and second electrode layers 216, 218 may be disposed on the top surface of the insulation layer in a coplanar, side-by-side arrangement as described above. The castellations 217, 219 of the first and second electrode layers 216, 218 may be arranged in an interdigitated or interleaved relationship to define a circuitous gap 221 therebetween. In various embodiments, the first and second electrode layers 216, 218 may be printed or deposited (e.g., via electrolytic deposition) on the top surface of the insulation layer 220. In other embodiments, the first and second electrode layers 216, 218 may be affixed or connected to the top surface of the insulation layer 220. For example, the first and second electrode layers 216, 218 may be affixed or connected to the insulation layer 220 with various adhesives, welds, etc. In other embodiments, the insulation layer 220 and the first and second electrode layers 216, 218 may be loosely stacked together and not connected or affixed to one another.

At block 320 of the exemplary method, the PTC material layer 214 may be disposed atop the first and second electrode layers 216, 218 and may cover the interdigitated castellations 217, 219. The PTC material layer 214 may thus provide an electrically conductive connection between the first and second electrode layers 216, 218. In various embodiments, the PTC material layer 214 may be affixed or connected to the first and second electrode layers 216, 218, such as with solder, welds, conductive adhesive, etc.

At block 330 of the exemplary method, the stacked layers of the PTC device 200, including the PTC material layer 214, the first and second electrode layers 216, 218, and the insulation layer 220, may be rolled together to form a jelly roll structure similar to that shown in FIG. 3B. Particularly, with the layers oriented in the manner shown in FIG. 6B, the layer stack may be rolled from its lower longitudinal edge upwardly and onto itself. When the layer stack is rolled together thusly, the insulation layer 220 provides an electrically insulating barrier between the rolled first and second electrode layers 216, 218 in the fully rolled jelly roll structure. Thus, when current is applied to the PTC device 200, the current flows from the first electrode layer 216, through the PTC material layer 214, to the second electrode layer 218 (or vice versa), and is prevented from shorting directly between the first and second electrode layers 216, 218.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A jelly roll-type positive temperature coefficient (PTC) device comprising:
   a PTC material layer;
   a first electrode layer disposed on a first surface of the PTC material layer;
   a second electrode layer disposed on a second surface of the PTC material layer opposite the first surface, wherein the PTC material layer is disposed between overlapping portions of the first electrode layer and the second electrode layer; and
   an insulation layer disposed on a surface of the second electrode layer opposite the PTC material layer, wherein the insulation layer covers a region where the first electrode layer overlaps the second electrode layer;
   wherein the first electrode layer, the PTC material layer, the second electrode layer, and the insulation layer are rolled together to define a jelly roll structure with the PTC material layer providing an electrically conductive pathway between the overlapping first and second electrode layers, and with the insulation layer providing an electrically insulating barrier between the first and second electrode layers.

2. The jelly roll-type PTC device of claim 1, wherein the first and second electrode layers are offset relative to one another, with a lateral edge of the first electrode layer extending beyond a first lateral edge of the PTC material layer and with a lateral edge of the second electrode layer extending beyond a second lateral edge of the PTC material layer opposite the first lateral edge.

3. The jelly roll-type PTC device of claim 1, wherein the insulation layer is wrapped entirely around the second electrode layer, the PTC material layer, and the first electrode layer and provides the jelly roll-type PTC device within an electrically insulating, protective wrapper.

4. The jelly roll-type PTC device of claim 1, further comprising a first conductive lead extending into, and connected to, rolls of the first electrode layer at a first longitudinal end of the jelly roll-type PTC device and a second conductive lead extending into, and connected to, rolls of the second electrode layer at a second longitudinal end of the jelly roll-type PTC device.

5. The jelly roll-type PTC device of claim 1, wherein the PTC material layer is formed of a polymeric PTC material.

6. The jelly roll-type PTC device of claim 1, wherein the insulation layer is formed of paper.

7. A method of making a jelly roll-type positive temperature coefficient (PTC) device, the method comprising:
   providing a PTC material layer;
   disposing a first electrode layer on a first surface of the PTC material layer;
   disposing a second electrode layer on a second surface of the PTC material layer opposite the first surface, with the PTC material layer disposed between overlapping portions of the first electrode layer and the second electrode layer;
   disposing an insulation layer on a surface of the second electrode layer opposite the PTC material layer, with the insulation layer covering a region where first electrode layer overlaps the second electrode layer; and
   rolling the first electrode layer, the PTC material layer, the second electrode layer, and the insulation layer together to define a jelly roll structure with the PTC material layer providing an electrically conductive pathway between the overlapping first and second electrode layers, and with the insulation layer providing an electrically insulating barrier between the first and second electrode layers.

8. The method of claim 7, wherein the first and second electrode layers are disposed in an offset relationship relative to one another, with a lateral edge of the first electrode layer extending beyond a first lateral edge of the PTC material layer and with a lateral edge of the second electrode layer extending beyond a second lateral edge of the PTC material layer opposite the first lateral edge.

9. The method of claim 7, further comprising wrapping insulation layer entirely around the second electrode layer, the PTC material layer, and the first electrode layer to provide the jelly roll-type PTC device within an electrically insulating, protective wrapper.

10. The method of claim 7, further comprising:
    inserting a first conductive lead into rolls of the first electrode layer at a first longitudinal end of the jelly roll-type PTC device and crimping the rolls of the first electrode layer onto the first conductive lead; and
    inserting a second conductive lead extending into rolls of the second electrode layer at a second longitudinal end of the jelly roll-type PTC device and crimping the rolls of the second electrode layer onto the second conductive lead.

11. A jelly roll-type positive temperature coefficient (PTC) device comprising:
    an insulation layer;

a first electrode layer and a second electrode layer disposed on the insulation layer, the first and second electrode layers disposed in a coplanar, side-by-side, interdigitated relationship; and a PTC material layer disposed on the first and second electrode layers and covering interdigitated portions of the first and second electrode layers;

wherein the insulation layer, first electrode layer, the second electrode layer, and the PTC material layer are rolled together to define a jelly roll structure with the PTC material layer providing an electrically conductive pathway between the interdigitated first and second electrode layers, and with the insulation layer providing an electrically insulating barrier between the first and second electrode layers.

12. The jelly roll-type PTC device of claim 11, wherein each of the first and second electrode layers has a plurality of castellations, the castellations of the first electrode layer being interleaved with the castellations of the second electrode layer.

13. The jelly roll-type PTC device of claim 11, wherein the first and second electrode layers are printed on a surface of the insulation layer.

14. The jelly roll-type PTC device of claim 11, further comprising a first conductive lead extending into, and connected to, rolls of the first electrode layer at a first longitudinal end of the jelly roll-type PTC device and a second conductive lead extending into, and connected to, rolls of the second electrode layer at a second longitudinal end of the jelly roll-type PTC device.

15. The jelly roll-type PTC device of claim 11, wherein the PTC material layer is formed of a polymeric PTC material.

16. The jelly roll-type PTC device of claim 11, wherein the insulation layer is formed of paper.

17. A method of making a jelly roll-type positive temperature coefficient (PTC) device, the method comprising:
providing an insulation layer;

disposing a first electrode layer and a second electrode layer on the insulation layer in a coplanar, side-by-side, interdigitated relationship;

disposing a PTC material layer on the first and second electrode layers with the PTC material layer covering interdigitated portions of the first and second electrode layers; and rolling the insulation layer, first electrode layer, the second electrode layer, and the PTC material layer together to define a jelly roll structure with the PTC material layer providing an electrically conductive pathway between the interdigitated first and second electrode layers, and with the insulation layer providing an electrically insulating barrier between the first and second electrode layers.

18. The method of claim 17, wherein the first and second electrode layers are disposed in an offset relationship relative to one another, with a lateral edge of the first electrode layer extending beyond a first lateral edge of the PTC material layer and with a lateral edge of the second electrode layer extending beyond a second lateral edge of the PTC material layer opposite the first lateral edge.

19. The method of claim 17, further comprising wrapping insulation layer entirely around the second electrode layer, the PTC material layer, and the first electrode layer to provide the jelly roll-type PTC device within an electrically insulating, protective wrapper.

20. The method of claim 17, further comprising:
inserting a first conductive lead into rolls of the first electrode layer at a first longitudinal end of the jelly roll-type PTC device and crimping the rolls of the first electrode layer onto the first conductive lead; and inserting a second conductive lead extending into rolls of the second electrode layer at a second longitudinal end of the jelly roll-type PTC device and crimping the rolls of the second electrode layer onto the second conductive lead.

\* \* \* \* \*